United States Patent [19]
Arend et al.

[11] Patent Number: 6,012,073
[45] Date of Patent: Jan. 4, 2000

[54] METHOD AND SYSTEM FOR DISPLAYING ORIGINAL DOCUMENTS AND TRANSLATIONS THEREOF

[75] Inventors: Mark B. Arend; Melanie B. Goldstein; Cecil J. Juanarena; Curtis G. Wong, all of Bellevue, Wash.

[73] Assignee: Corbis Corporation, Bellevue, Wash.

[21] Appl. No.: 08/734,232

[22] Filed: Oct. 21, 1996

[51] Int. Cl.$^7$ .................................. G06T 3/20; G06T 3/40
[52] U.S. Cl. ........................ 707/526; 707/517; 707/536; 345/438; 345/439
[58] Field of Search .................................. 707/500, 502, 707/517, 521, 540, 536; 345/435, 439, 438; 704/2, 3; 434/157

[56] References Cited

U.S. PATENT DOCUMENTS

| | | | |
|---|---|---|---|
| 4,599,612 | 7/1986 | Kaji et al. .................................. | 340/723 |
| 5,021,989 | 7/1991 | Fujisawa et al. ........................ | 364/900 |
| 5,133,052 | 7/1992 | Bier et al. ................................. | 395/155 |
| 5,262,926 | 11/1993 | Hall ........................................... | 361/681 |
| 5,278,980 | 1/1994 | Pedersen et al. ......................... | 395/600 |
| 5,353,393 | 10/1994 | Bennett et al. ........................... | 395/135 |
| 5,384,901 | 1/1995 | Glassner et al. .......................... | 395/131 |
| 5,408,250 | 4/1995 | Bier ........................................... | 345/169 |
| 5,442,788 | 8/1995 | Bier ........................................... | 395/650 |
| 5,467,441 | 11/1995 | Stone et al. ............................... | 395/133 |
| 5,479,603 | 12/1995 | Stone et al. ............................... | 395/161 |
| 5,561,811 | 10/1996 | Bier ........................................... | 395/825 |
| 5,710,899 | 1/1998 | Eick .......................................... | 395/339 |

FOREIGN PATENT DOCUMENTS

| | | |
|---|---|---|
| 2124604 | 1/1995 | Canada . |
| 0 635 779 A1 | 1/1995 | European Pat. Off. . |
| 0 635 780 A1 | 1/1995 | European Pat. Off. . |
| 0 635 781 A1 | 1/1995 | European Pat. Off. . |
| 0 635 808 A2 | 1/1995 | European Pat. Off. . |

OTHER PUBLICATIONS

Bier, Eric A., et al., "A Taxonomy of See–Through Tools," *Proceedings of CHI* 94, Boston, MA, Apr. 24–28, ACM, New York (1994), 13 pages.

Stone, Maureen C., et al., "The Movable Filter as a User Interface Tool," *Proceedings of CHI* 94, Boston, MA, Apr. 24–28, ACM, New York (1994), 13 pages.

The Magic Lens Interface Project, URL=http://www/istl/projects/MagicLenses/, download date Oct. 3, 1996, 1 page.

Toolglass and Magic Lenses: The See–Through Interface, URL=http://www/istl/projects/MagicLenses/, download date Oct. 3, 1996, 1 page.

Graphics and Interaction Research, URL=http://www/istl/projects/MagicLenses/, download date Oct. 3, 1996, 1 page.

*Magic Lens* Demo, URL=http://www/istl/projects/MagicLenses/, download date Oct. 3, 1996, 1 page.

A.D.A.M. The Inside Story 1997 Edition, Computer Software, Program, published by A.D.A.M. Software, Inc., Copy of User's Guide.

Bier, Eric A., et al., "Toolglass and Magic Lenses: The See–Through Interface," *Proceedings of Siggraph* 93 (Anaheim, August), *Computer Graphics Annual Conference Series*, ACM, 1993, 10 pages.

*Primary Examiner*—Anton W. Fetting
*Assistant Examiner*—Cong-Lac Huynh
*Attorney, Agent, or Firm*—Seed and Berry LLP

[57] ABSTRACT

An improved method and system for displaying original documents and translations and transcriptions thereof is provided. In a preferred embodiment, separate spatially aligned bitmaps are created and displayed in a main display and translation window. Image scrolling and movement of the translation window facilitate review and study of larger document pages. An overview feature with logical links to subject matter categories and a left to right mirroring feature are provided in preferred embodiments.

11 Claims, 20 Drawing Sheets

6,012,073

METHOD AND SYSTEM FOR DISPLAYING ORIGINAL DOCUMENTS AND TRANSLATIONS THEREOF

TECHNICAL FIELD

This application relates to a computerized method and system for displaying digital images of original documents and translations thereof.

BACKGROUND OF THE INVENTION

Original documents of historic, academic, or current interest often require translations to enable interested persons to review or study the document. For example, the original may be in an ancient or obscure language known to relatively few persons who desire to review the document. Even if a reviewer can read the language of the original, the reviewer may have greater fluency in another language, making it desirable to have both the original and a translation available.

Traditional methods have displayed the original text side-by-side or top to bottom with the translation on the same page, or displayed a complete page of the original text opposite a page containing the corresponding translation. Although existing display methods provide some assistance to reviewers, such methods have been less than optimal for situations where study or review of the original and translation is desired.

SUMMARY OF THE INVENTION

The present invention comprises an improved method and system for displaying original documents and translations thereof. In a preferred embodiment, a digital image of an original documents is stored in a computer system. At least one corresponding digital image of a translation of the original is also stored on the system, with its contents indexed spatially to the original. An image of the original is presented in a main display on the display screen of the computer system. A translation window may be selectively displayed over a portion of the main display. When the translation window is activated, it presents a translation of the overlaid portion of the original.

In a preferred implementation where the original document image is larger than the main display, the system allows scrolling through the original document with the translation window fixed relative to the main display, or up and down movement of the translation window relative to the main display.

In a preferred implementation, the user may select from one of several versions of a document (i.e., the original text, translation 1, translation 2, etc.) for display in both the main display and the translation window.

In implementations for multi-page documents, an overview display may be provided for easy access and navigation through the document. For documents addressing multiple subjects, a list of subjects can be included with the overview, with links between the subject listings and the page displays to facilitate navigation and selection through the document.

For implementations of the present invention where the language of the original and translations thereof are not all presented left to right or right to left, a mirroring function is preferably provided to invert the images for consistent presentation.

DETAILED DESCRIPTION OF THE INVENTION

Figure 1:
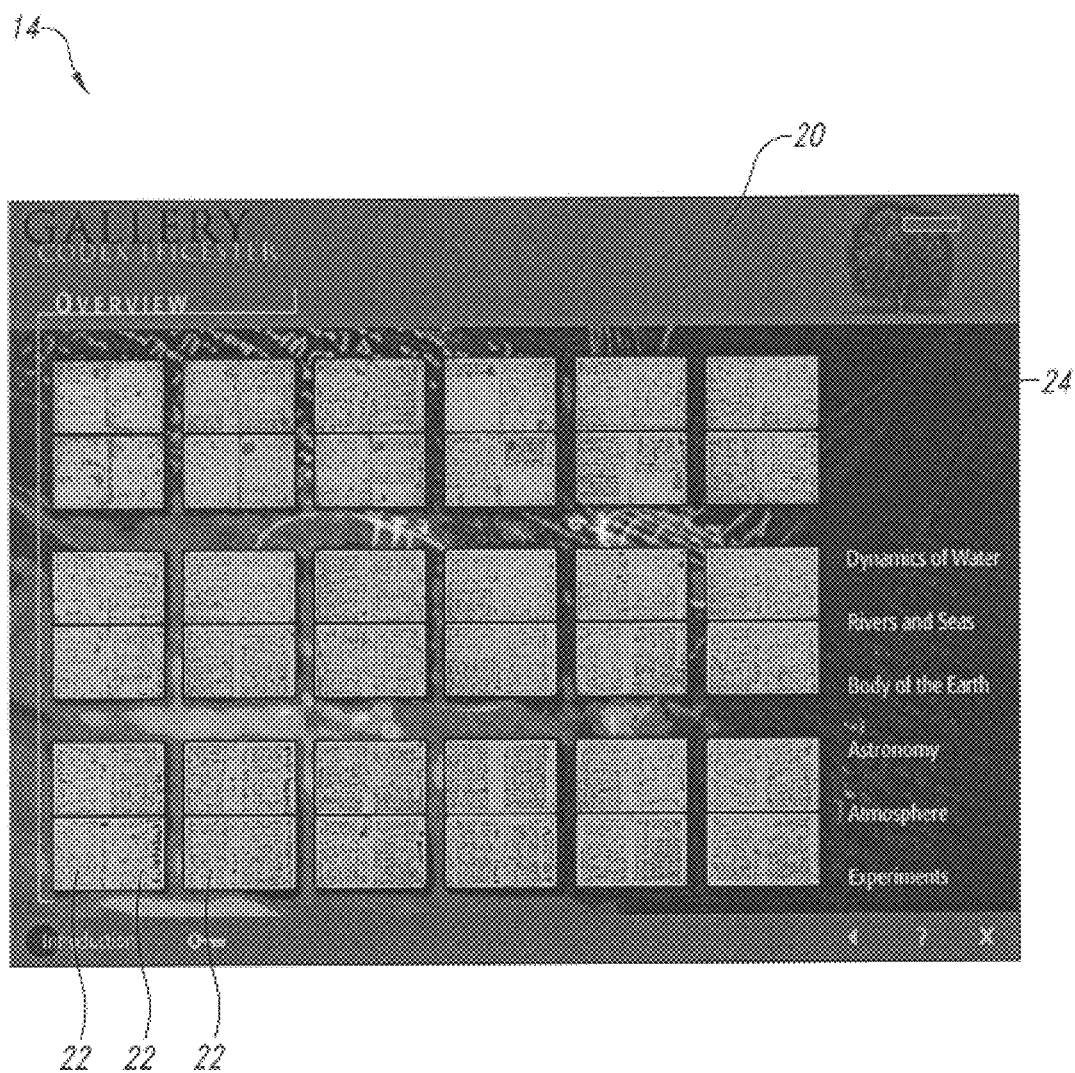
FIG. 1 is an illustration of a computer screen display in accordance with a preferred embodiment of the invention, showing an overview screen displaying reduced size images of the pages of a multi-page original document.

The present invention comprises an improved method and system for displaying original documents and translations thereof in a manner that permits ready comparison and facilitates review and study of the original documents and translations. In a preferred embodiment, an image of the original document 10 appears in a main display 12 on the screen display 14 of a computer system (not shown). A translation window 16 appears over the main display 12 and presents a translation 18 of the portion of the original document which is below the translation window. Thus, if an English literate user is studying a handwritten original document in Italian or ancient Greek, for example, the user can review the original document and simultaneously review and compare an English language translation. Scrolling the original document in the main display 12 or moving the translation window 16 allows the user to review a translation of the original text, yet have immediate and ready access to the original text.

The preferred embodiment illustrated herein is a system designed to display digital images of Leonardo da Vinci's Codex Leicester as the original document and an English language translation as a first translation, and a transcription from Leonardo da Vinci's handwritten text to Italian text in a conventional type font as the second translation.

Leonardo da Vinci's Codex Leicester is a 72 page original manuscript, handwritten in Italian with various notes and illustrations. It was intended to be a comprehensive treatise on water, although portions of it discuss astronomy and the atmosphere, for example. It includes observations, experiments and debates, and is considered to be a rare portrait of the mind of Leonardo da Vinci at work. As such, the original text is of interest to students and scholars.

The Codex Leicester manuscript is handwritten in Leonardo da Vinci's "mirror script," which he wrote backwards, right to left. As such, a translation or transcription arranged spatially in the same manner as Leonardo da Vinci's original handwritten text must be "mirrored" before it can be read left to right in the conventional manner of English or Italian language text.

The methods and systems of the present invention are perhaps most easily understood with reference to the operation of this preferred embodiment, which displays images of the original Codex Leicester and translations and transcriptions thereof. It will, of course, be apparent to those of skill in the art that the methods and systems of the present invention can be implemented with advantage in other embodiments. It will also be apparent that the features of the preferred embodiment described herein need not all be implemented to enjoy the advantages of the claimed invention.

As seen in FIG. 1, the computer display screen 14 includes an overview screen 20 which includes reduced size images 22 of the seventy-two individual pages of the Codex Leicester manuscript. A subject list 24 appears to the right of the reduced size page images 22, identifying various subject categories addressed in the manuscript. For example, the categories "Dynamics of Water," "Rivers and Seas," "Body of the Earth," "Astronomy," "Atmosphere," and "Experiments," are included in the list.

Figure 2:
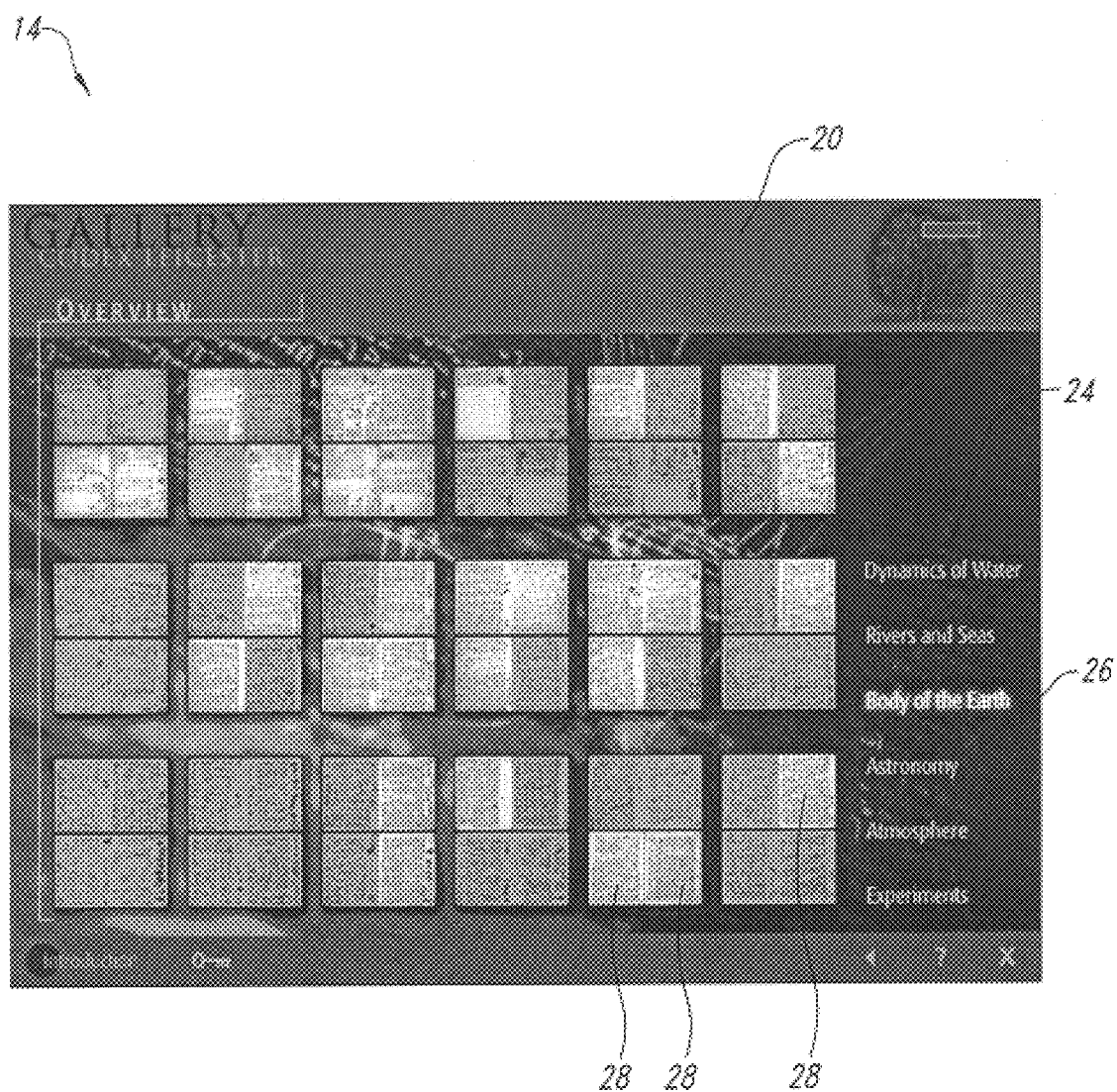
FIG. 2 is an illustration of the overview screen of FIG. 1, with one item in the subject list selected, and corresponding pages of the original highlighted.
Figure 4:
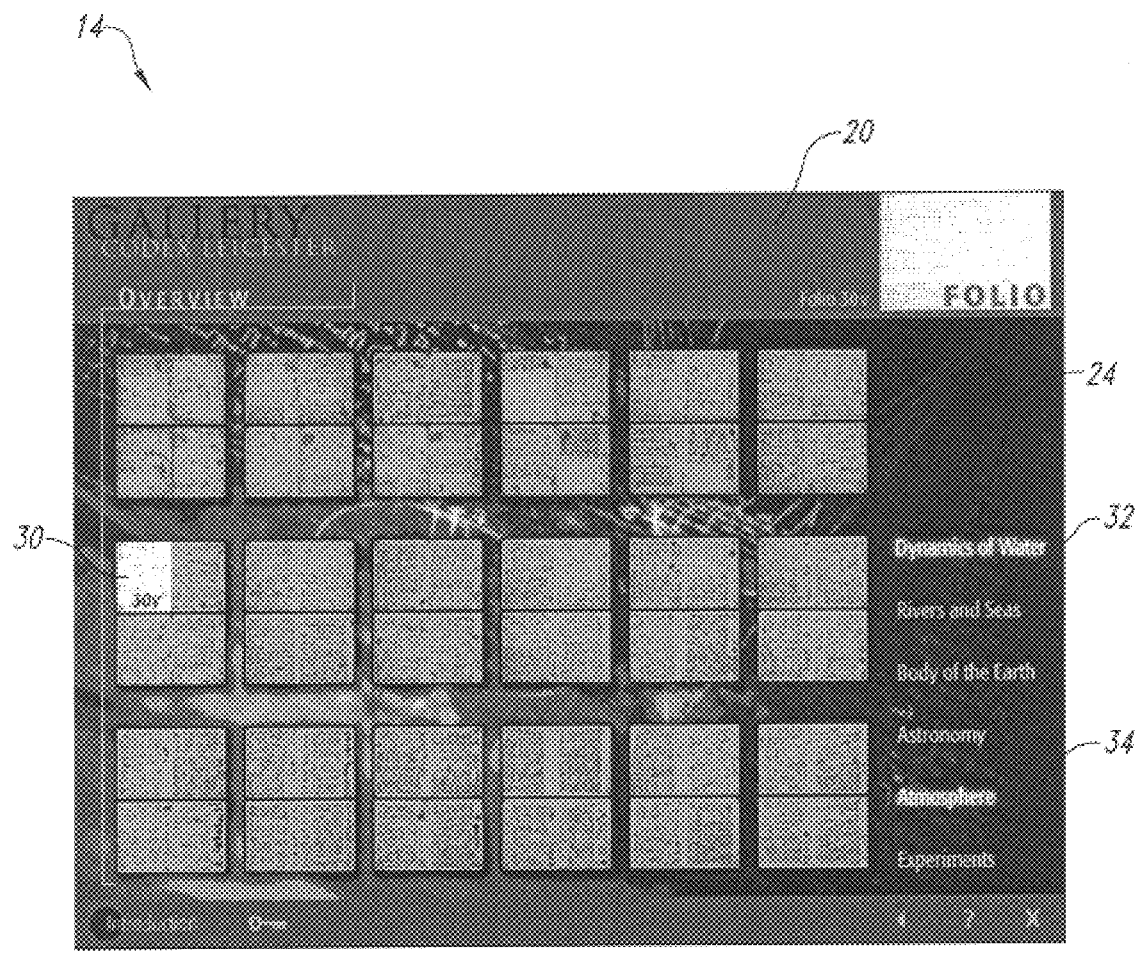
FIG. 4 is an illustration of the overview screen of FIG. 1 with an individual page image selected, and corresponding items on the subject list highlighted.

The reduced size page images 22 of the overview display are preferably logically linked to the subject list 24 so that when a user selects an item from the subject list, the pages having corresponding content are highlighted. For example, FIG. 2 shows the Body of the Earth 26 subject selected by the user. The reduced size images 28 corresponding to pages of the manuscript having content relating to that subject are highlighted when the subject is selected. Conversely, FIG. 4 illustrates the overview screen 20 when an individual reduced size page image 30 has been selected. The selected page image 30 is highlighted as are the entries 32, 34 on the subject list 24 for which the selected page 30 has content. Thus, a user selecting the page 30 shown in FIG. 4 receives immediate feedback that the page contains content relating to the Dynamics of Water 32 and the Atmosphere 34.

Figure 3:
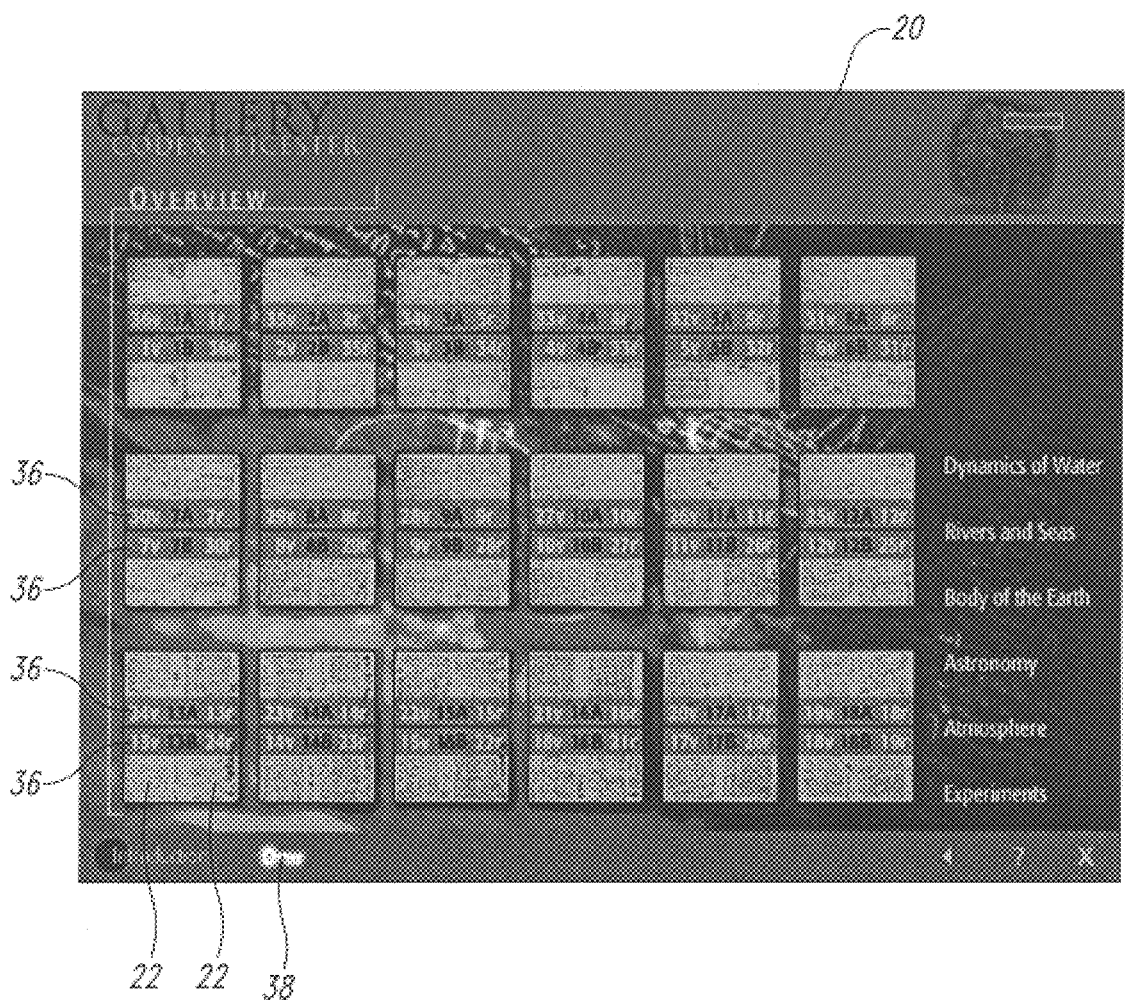
FIG. 3 is an illustration of the overview screen of FIG. 1 with the "key" feature of the illustrated embodiment selected to display page numbering systems for the original document.

Scholars of the Codex Leicester have developed numbering systems for the various pages of the manuscript. The overview screen 20 of the preferred embodiment illustrated herein includes a display mode illustrated in FIG. 3 in which these numbering systems are displayed on page number displays 36 overlaying the individual page displays 22 when a key icon 38 has been selected.

Figure 5:
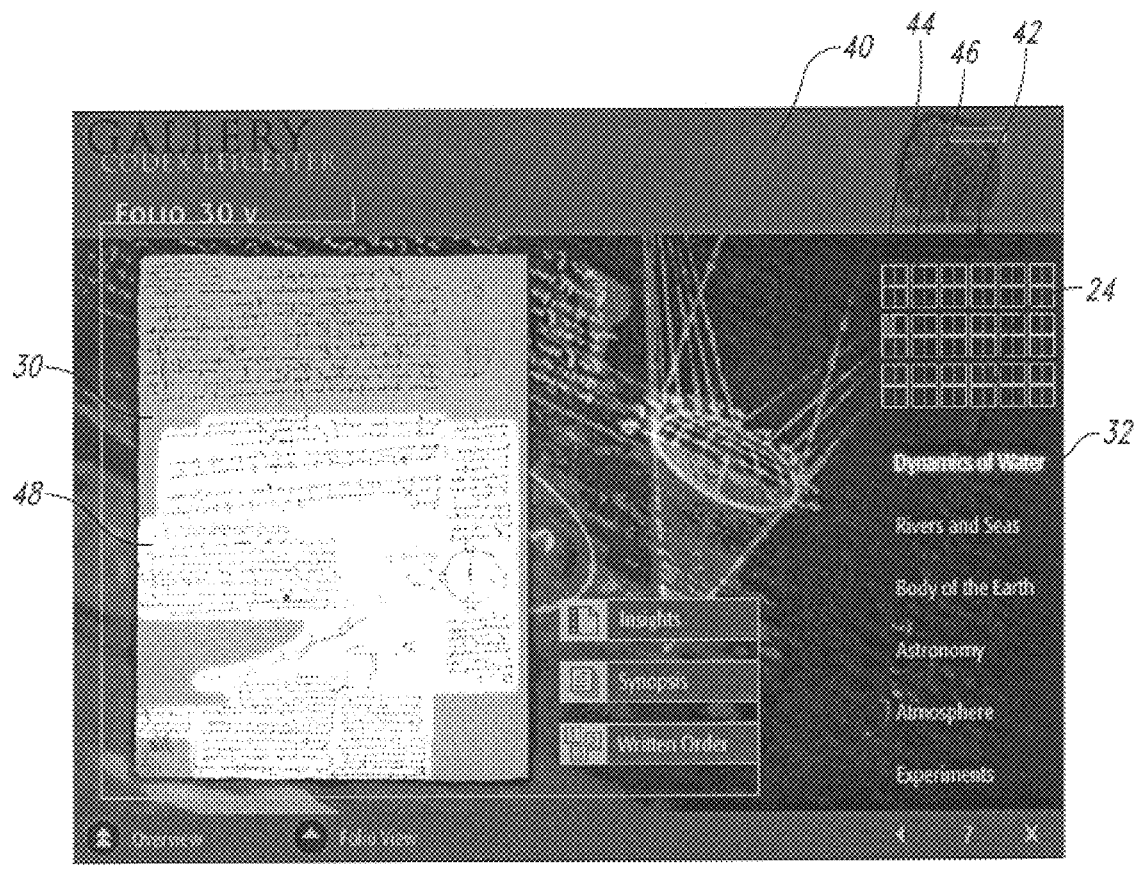
FIG. 5 is an illustration of a computer screen display in accordance with a preferred embodiment of the present invention, showing a selected page with content relating to a first subject on the subject list highlighted.

FIG. 5 illustrates a page view screen 40 corresponding to the reduced size page image 30 selected from the overview screen 20. A map 42 in the upper right portion of the page screen illustrates the location 44 of the selected page in the manuscript, mimicking the presentation of the reduced size page images 22 in the overview screen 20. The map also acts as a navigation tool, permitting the user to select pages for display by clicking the mouse cursor on a different page cell, for example, cell 46 in the page map.

FIG. 5 illustrates the page view screen 40 when the mouse cursor (not shown) is positioned over the highlighted portion 48 of the page display. The highlighted portion corresponds to the content of the page 30 which relates to the subject Dynamics of Water 32 from the subject list 24. The Dynamics of Water 32 subject is highlighted in the subject matter list 24. When the mouse cursor (not shown) is moved into the upper portion of page 30, the content 50 relating to the subject Atmosphere 34 from the subject list 24 is highlighted on the page display, and Atmosphere 34 is highlighted in the subject matter list 24.

Figure 7:
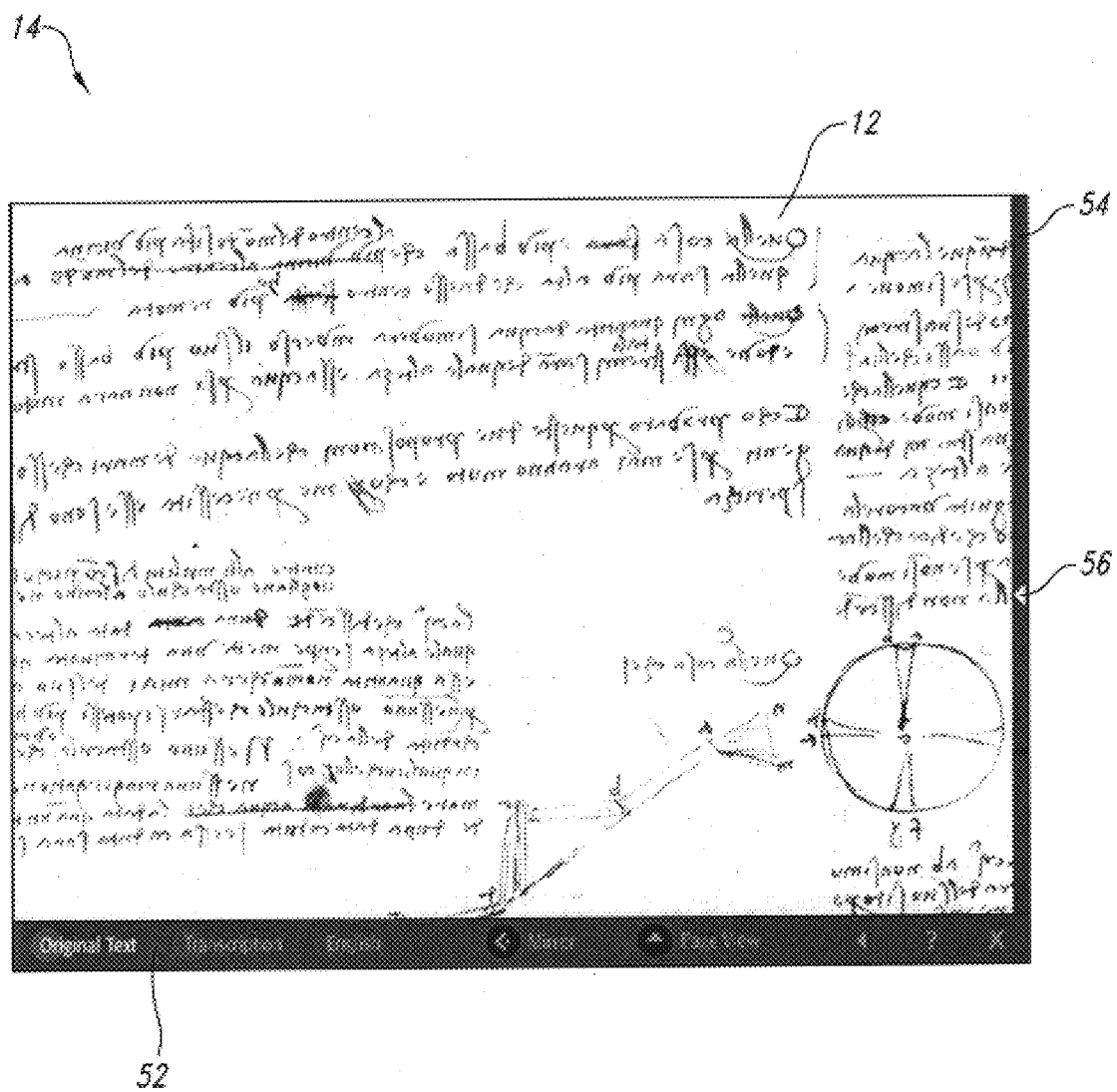
FIG. 7 is an illustration of a screen display in accordance with a preferred embodiment of the present invention, showing a first portion of the original document page from FIGS. 5 and 6 displayed in the main display.

When a user clicks the computer's mouse button (not shown) on the page 30 at a location in the Dynamics of Water content area 48 (see FIG. 5), the portion of that page of the Codex Leicester manuscript surrounding the area where the user has clicked will be displayed in the main display 12 of the computer screen 14 as shown in FIG. 7. The main display 12 includes a task bar 52 at the bottom portion thereof, which contains various commands and options which can be selected by the user. A side bar 54 includes a triangular translation window button 56 which can be selected by the user to display the translation window 16.

Figure 6:
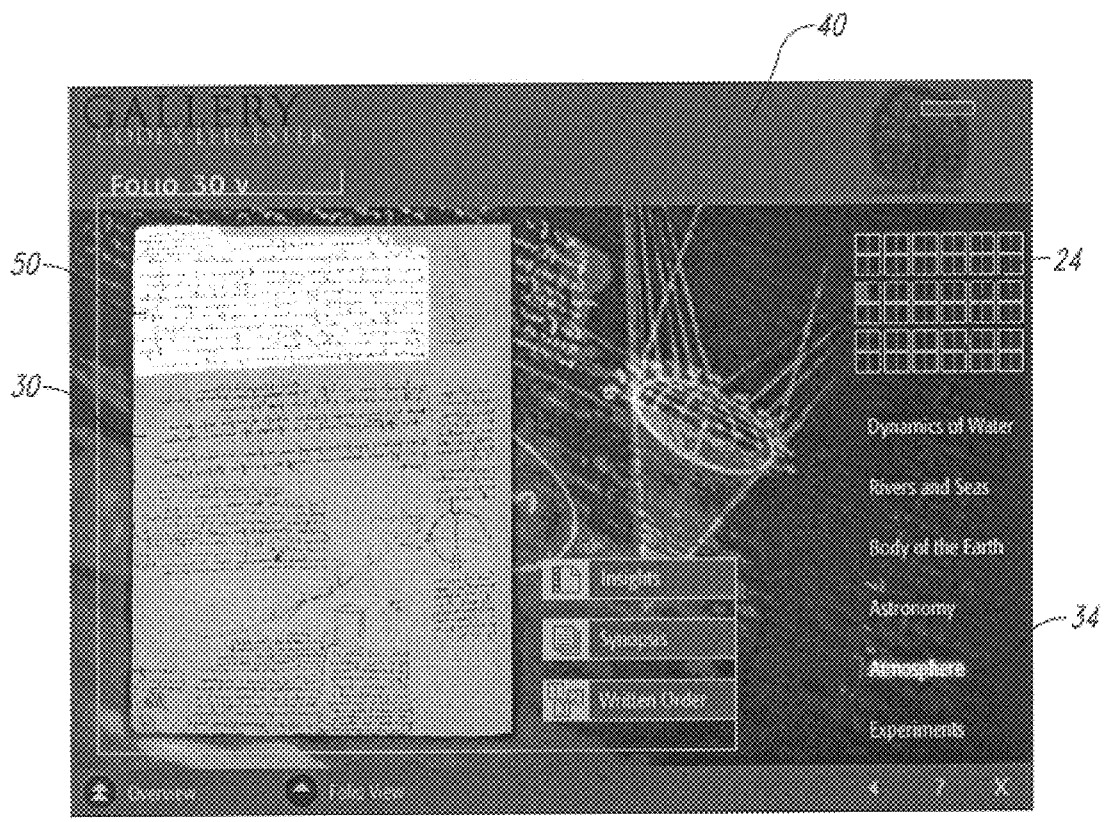
FIG. 6 is an illustration of the individual page display of FIG. 5, with content relating to a second subject on the subject list highlighted.
Figure 8:
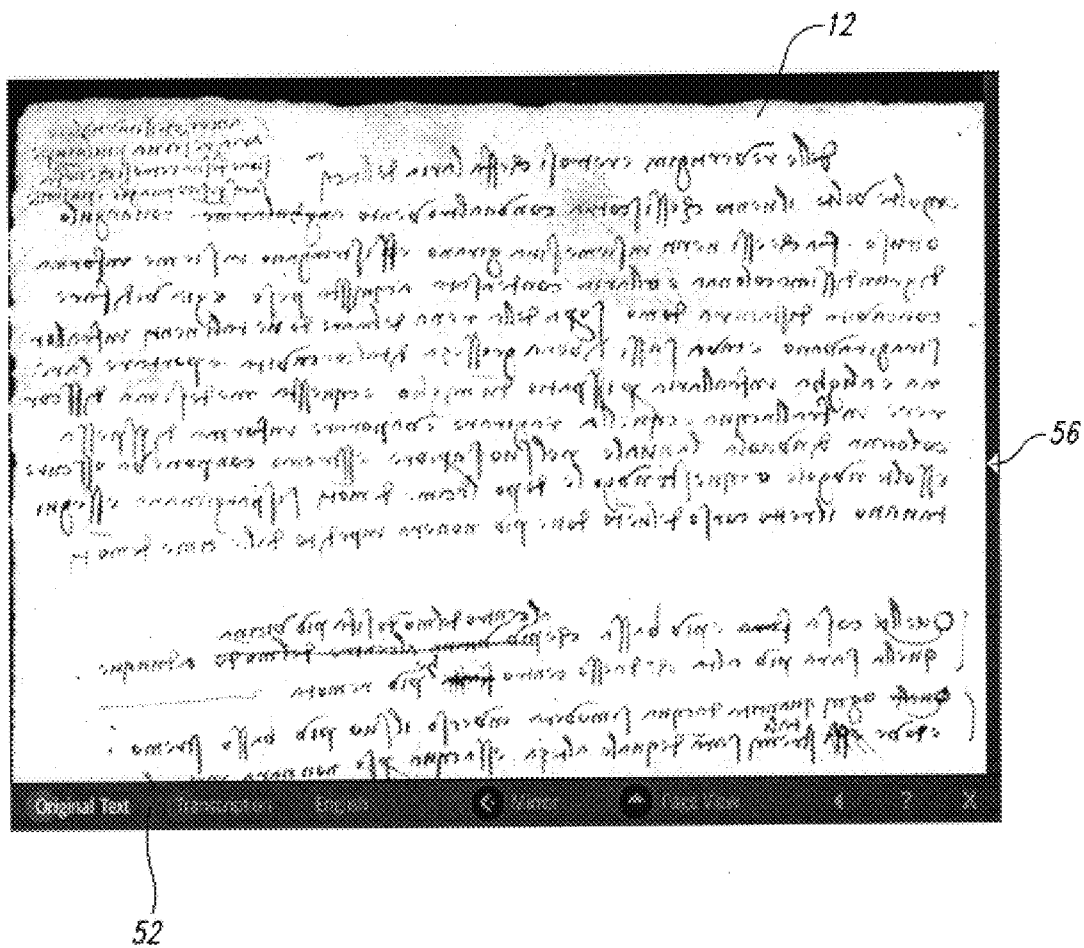
FIG. 8 is an illustration of a screen display in accordance with a preferred embodiment of the present invention, showing a second portion of the original document page from FIGS. 5 and 6 displayed in the main display.

FIG. 8 illustrates the main display 12 displaying the portion 50 of page 30 (see FIG. 6) with content relating to the Atmosphere. A user can arrive at the manuscript display of FIG. 8 by either clicking in region 50 from the page view screen 40 of FIG. 6, or when viewing the lower portion of the page 30 in the main display 12 as shown in FIG. 7, scrolling the contents of the main display upwardly in a conventional manner.

Figure 9:
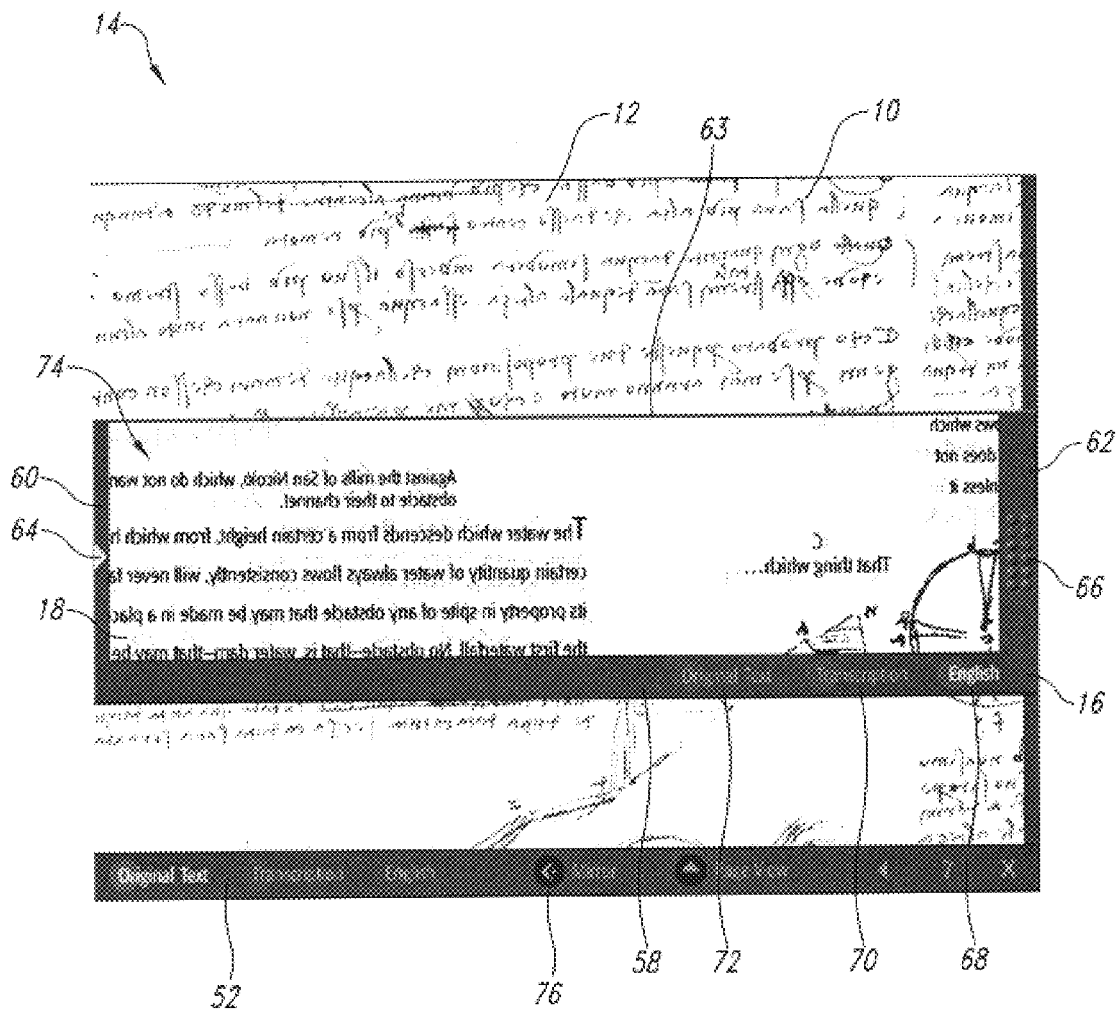
FIG. 9 is an illustration of a computer screen display in accordance with a preferred embodiment of the present invention, wherein the translation window has been activated and is displayed over a portion of the main display shown in FIG. 7.

When a user selects the translation window button 56 shown in FIGS. 7 and 8, the display window 16 appears over the main display 12 in the manner shown in FIG. 9. The translation window includes its own task bar 58, a left side bar 60, a right side bar 62 and a top border 63. The left side bar 60 includes a triangular close button 64 which, when selected by the user, will close the translation window and return the main screen to the configuration shown in FIG. 8. The left side bar 60, task bar 58, right side bar 62 and top border 63 of the translation window 16 are each linked to the computer system's pointing device (not shown) such that the user can "drag" the display window up and down with respect to the main display 12 in a conventional manner, by depressing the left mouse button and moving the mouse, or taking another comparable action with another pointing device. The right task bar includes a number of small nubs 66 to give the user a visual cue that the translation window 16 can be moved up and down by dragging the mouse cursor in this area.

Figure 10:
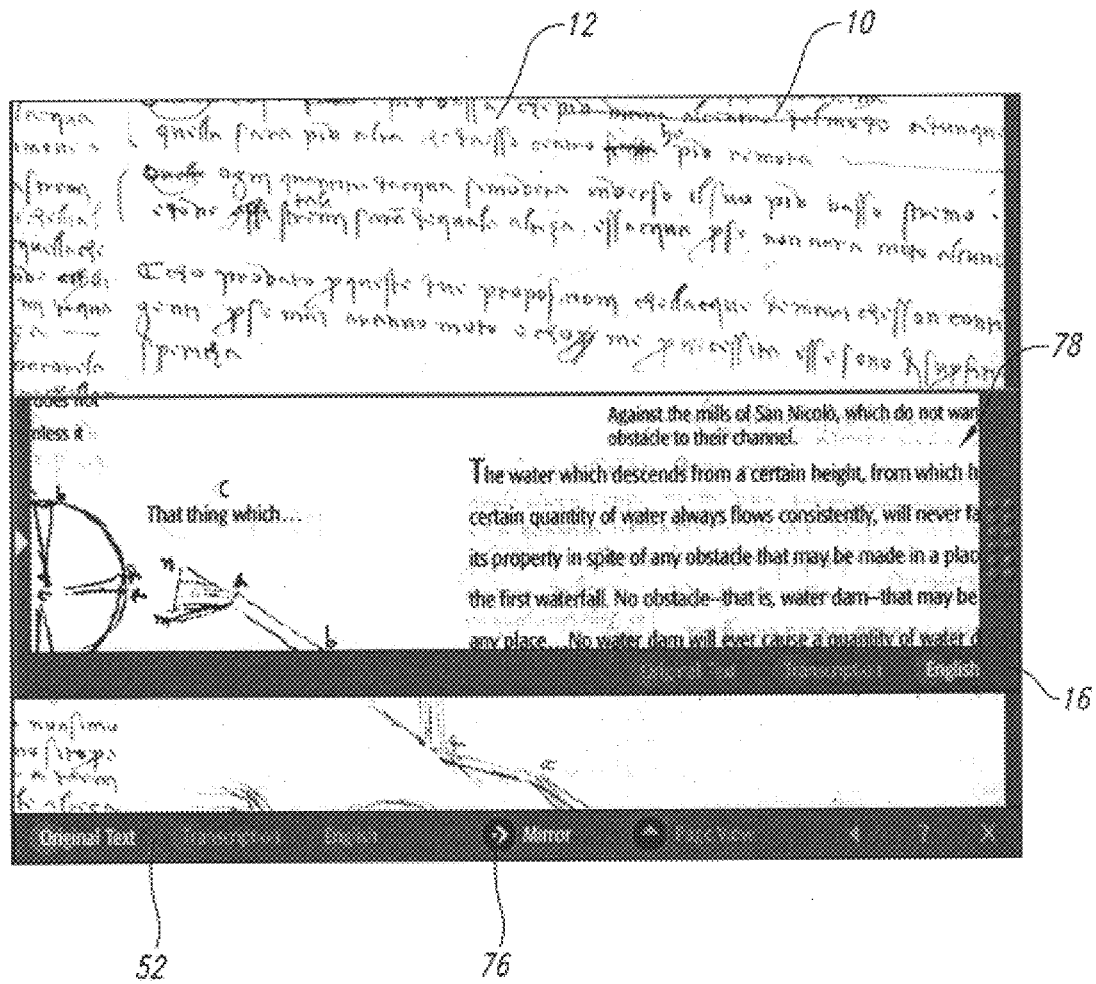
FIG. 10 is an illustration of a computer screen display in accordance with a preferred embodiment of the present invention, wherein the mirroring feature has been activated to present a mirror image of the original document and translation of FIG. 9.
Figure 11:
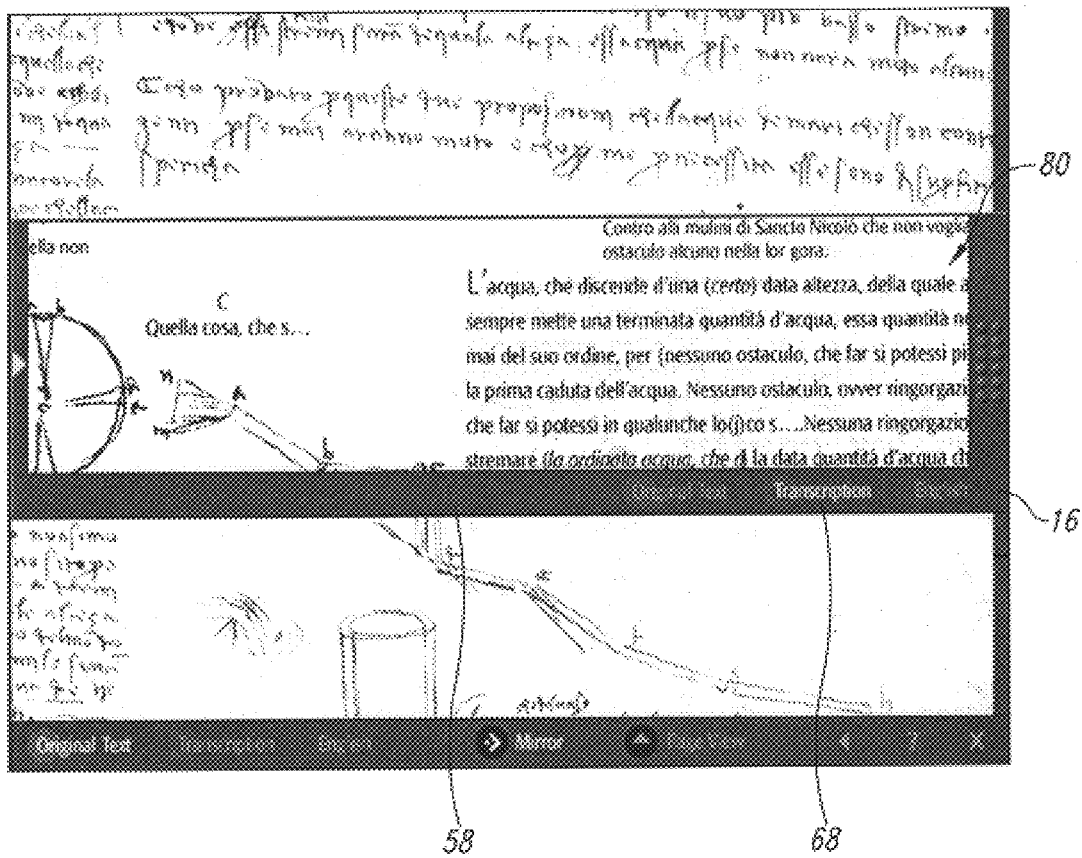
FIG. 11 is an illustration of a computer screen display in accordance with a preferred embodiment of the present invention, wherein the translation window of FIG. 10 has been modified to display a second translation.
Figure 12:
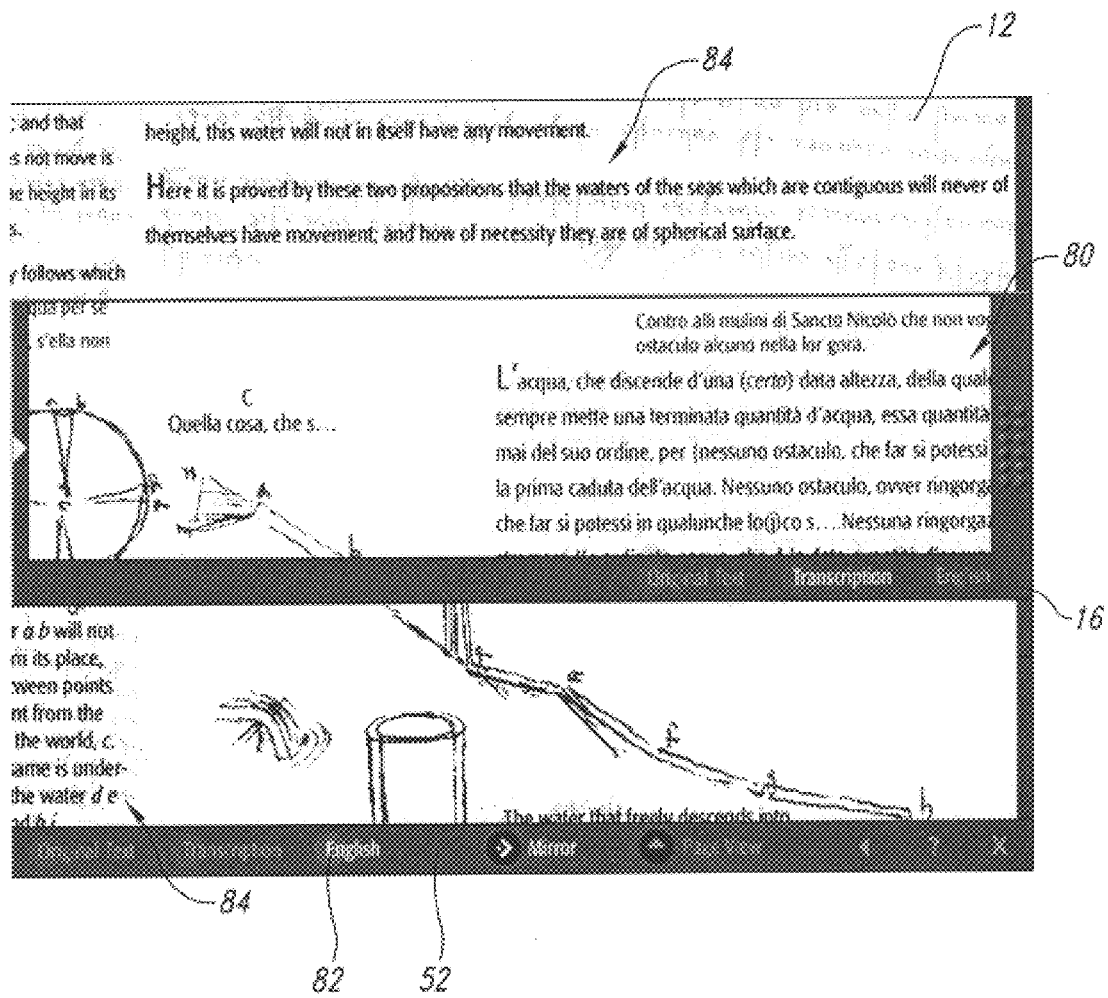
FIG. 12 is an illustration of a computer screen display in accordance with a preferred embodiment of the present invention, wherein the main display of FIG. 11 has been modified to display the first translation.

The translation window 16 illustrated in FIG. 9 has selected an English language translation for display in the translation window. A user may select buttons on the translation window task bar 58 to display "English" 68, an Italian "Transcription" 70 or the "Original Text" 72 in the translation window. FIG. 9 also illustrates the English language translation aligned spatially with Leonardo da Vinci's original transcript. As such, the English language text 74 is aligned right to left, presenting a mirror image of conventional English language text. The task bar 52 of the main display 12 includes a "Mirror" button 76 which, when selected, will cause a mirror image of the original text 10 to be displayed in the main display 12 and a mirror image of the English language text 78 to be displayed in the display window 16, as seen in FIG. 10. FIG. 10 thus presents a mirror image of Leonardo da Vinci's original handwritten manuscript in the main display 10, and a conventional left to right English language translation 78 in the translation window 16, with both images aligned spatially.

If the user selects the Transcription button 68 from the task bar 58 of the translation window 16, an Italian language transcription 80 of Leonardo da Vinci's original manuscript will appear in the translation window 16. Similarly, the user may select the English button 82 from the task bar 52 of the main display 12 to cause an English language translation 84 of Leonardo da Vinci's manuscript to appear in the main display 12.

Figure 13:
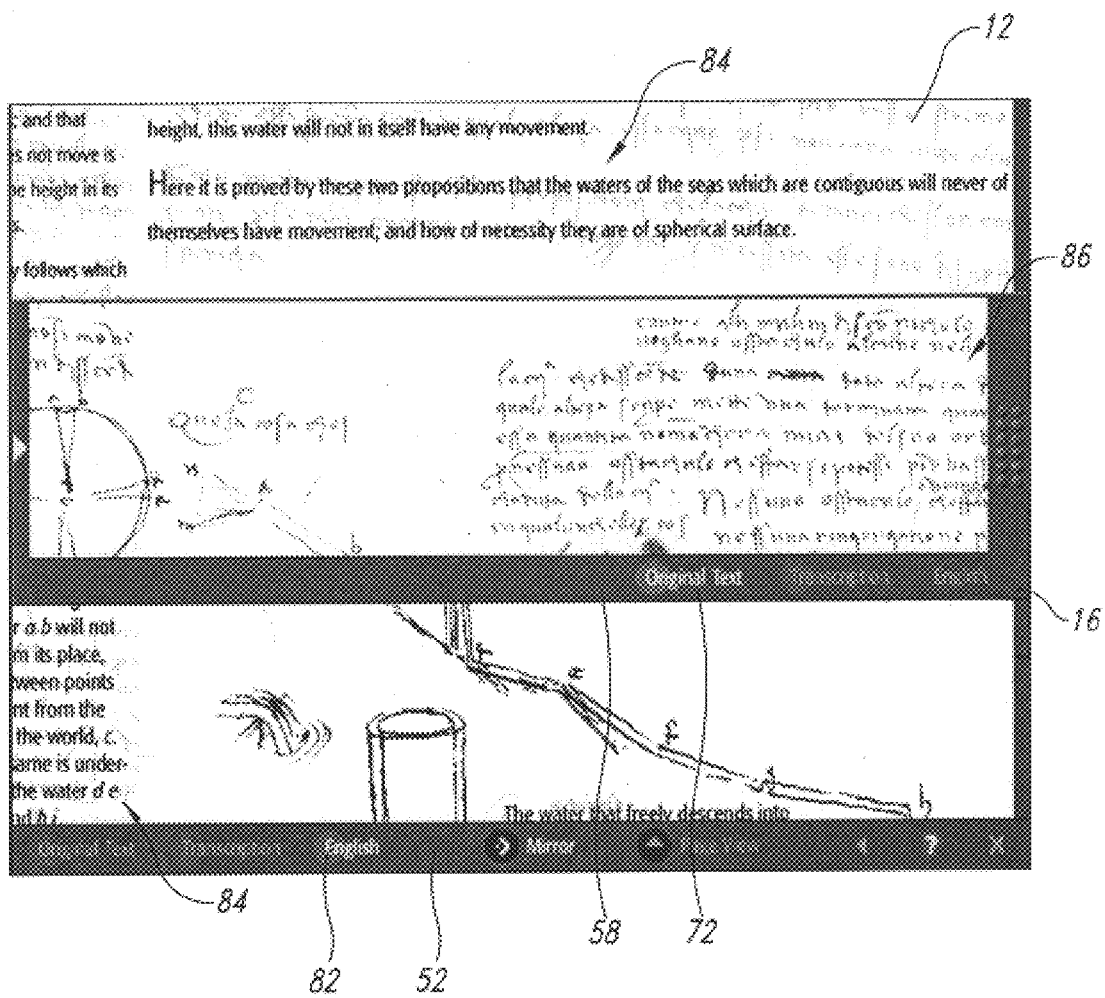
FIG. 13 is an illustration of a computer screen display in accordance with a preferred embodiment of the present invention, wherein the translation window of FIG. 12 has been modified to present the original document.

Selecting the Original Text button 72 in the task bar 58 of the translation window 16 causes the original manuscript 86 to appear in the translation window 16 in the manner shown in FIG. 13. With this selection and the English language translation 84 of the manuscript shown in the main display window 12, an English literate user also has ready access to both the original text and English language translation.

Figure 14:
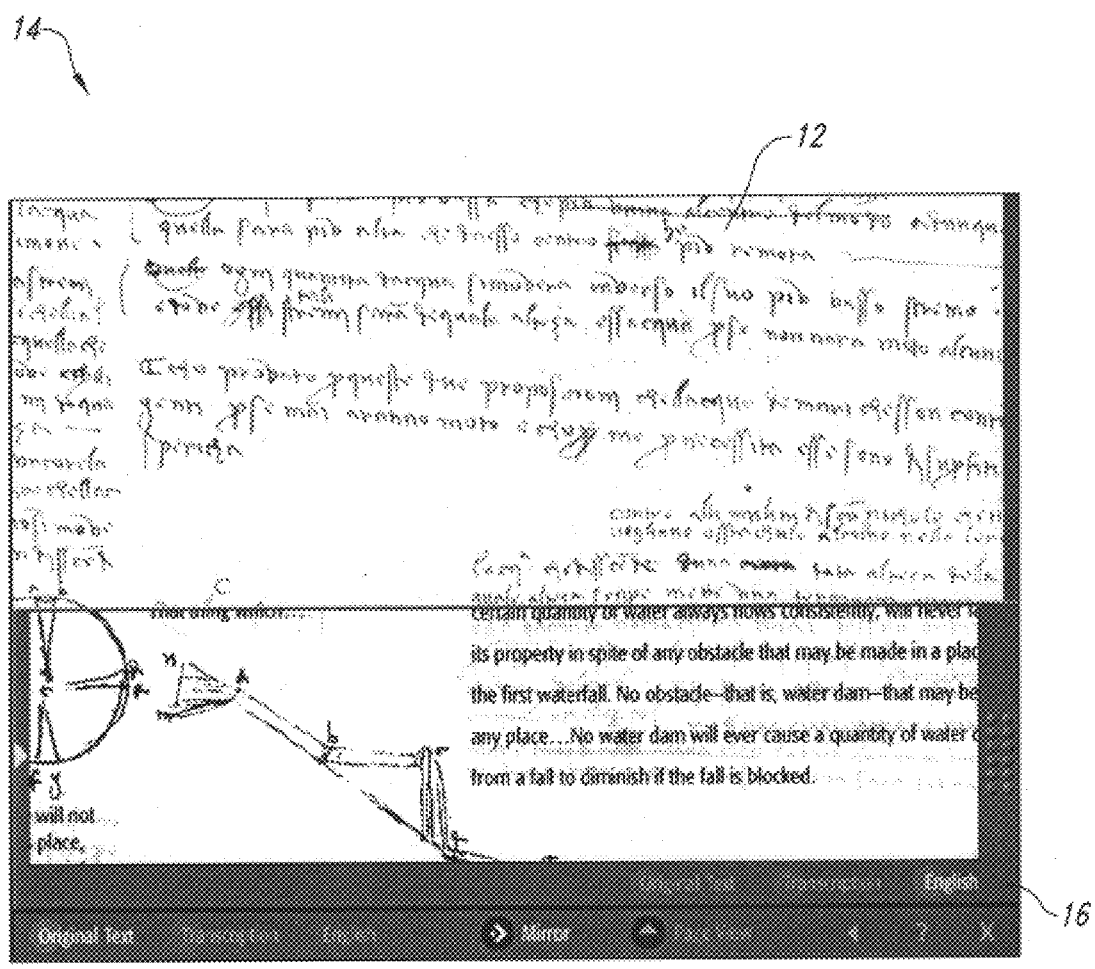
FIG. 14 is an illustration of a computer screen display in accordance with a preferred embodiment of the present invention wherein the translation window of FIG. 10 has been moved to the bottom of the main display.
Figure 15:
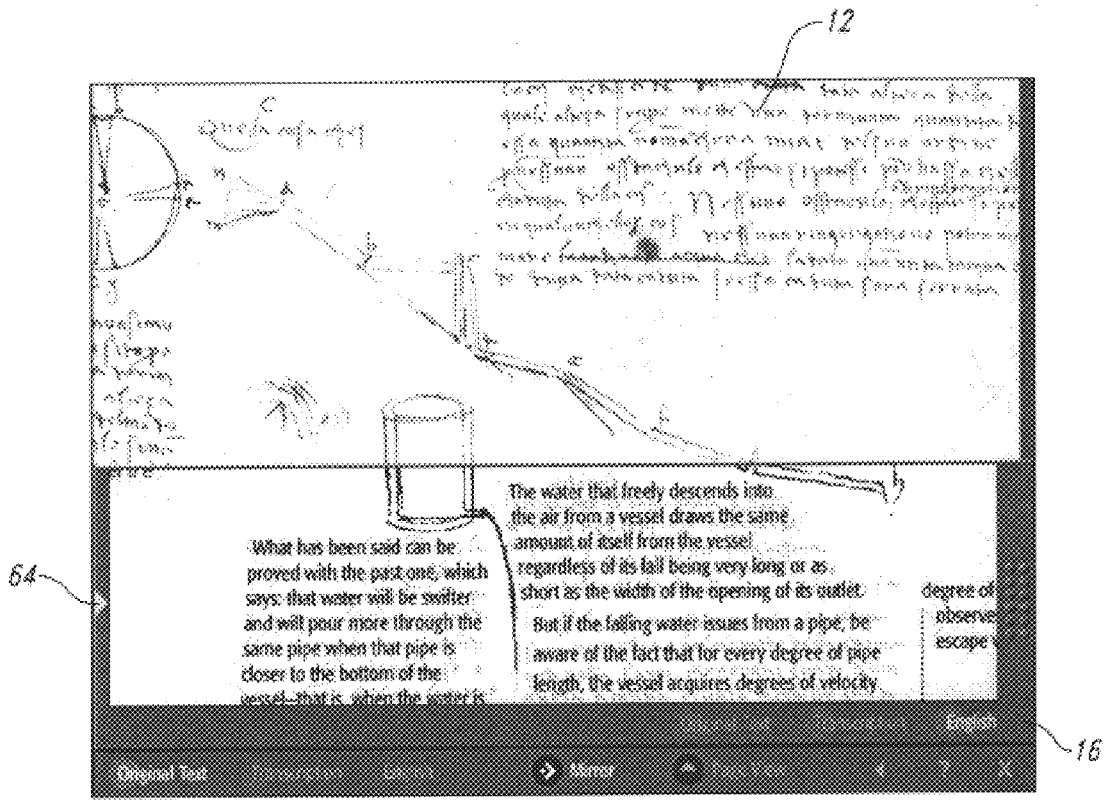
FIG. 15 is an illustration of a computer screen display in accordance with a preferred embodiment of the present invention, wherein the main display has been scrolled downwardly.

As previously indicated, the translation window 16 can be moved up and down within the main display 12. FIG. 14 illustrates the display window 16 positioned at the bottom of the main display area. Dragging the mouse cursor within the main display 12 causes the overall image to be scrolled up and down or left to right within the main display 12 in a conventional manner. When the display window 16 is open, the translated content is scrolled along with the main display 12 content, to keep the two images spatially aligned, as shown in FIG. 15.

Figure 16:
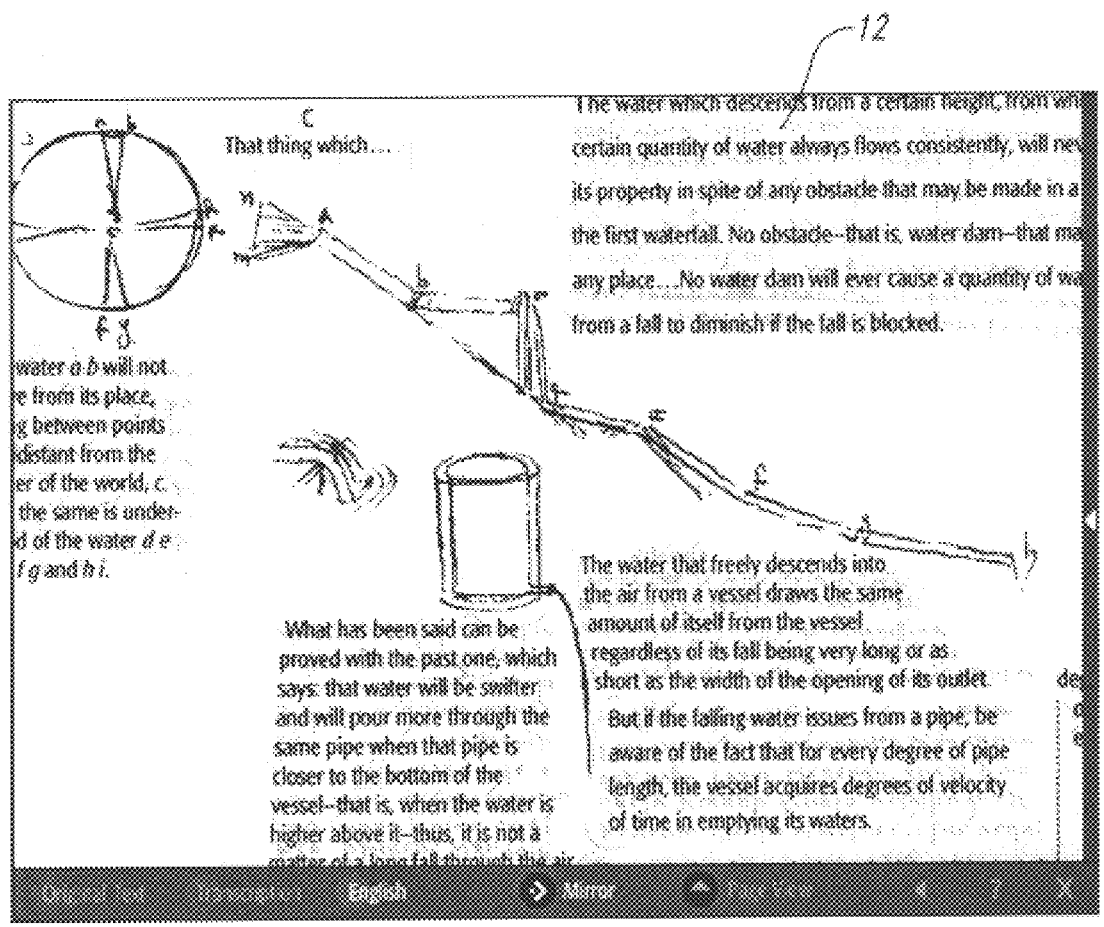
FIG. 16 is an illustration of a computer screen display in accordance with a preferred embodiment of the present invention, wherein the display of FIG. 15 has been modified to deactivate the translation window, and an English language translation has been selected for display in the main display.

Clicking on the translation window close button 64 causes the translation window 16 to close. FIG. 16 illustrates the preferred embodiment with the translation window 16 closed and an English language translation selected for display in the main window.

Figure 20:
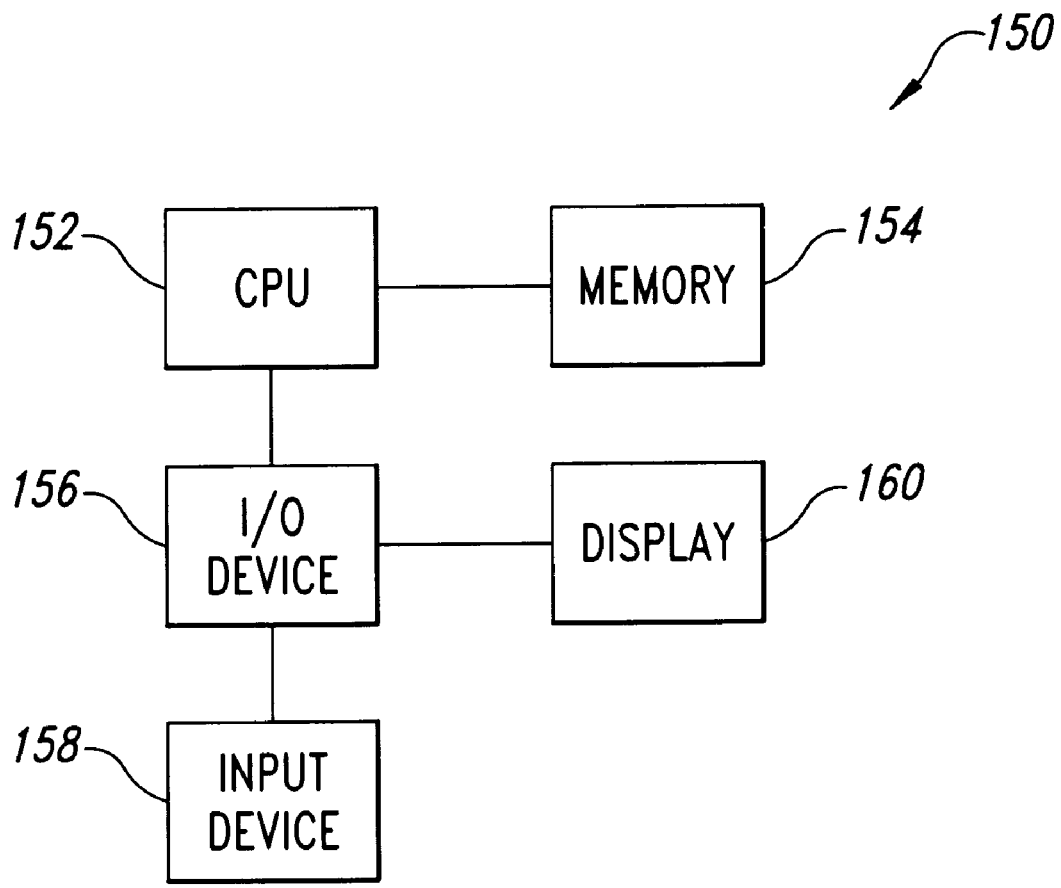
FIG. 20 is a block diagram illustrating a computer system in accordance with the present invention.

The methods and systems of the present invention can be implemented on a conventional computer system 150 using various existing systems and tools. The block diagram of FIG. 20 illustrates the basic elements of such a computer system. A CPU 152 carries out the various calculations and operations, with the bitmaps and implementing computer code stored in the system memory 154 during operation. The CPU 152 communicates through a standard I/O device 156 to accept user input through an input device 158 such as a mouse (not shown), track ball (not shown) or keyboard (not shown). The displays described herein are presented on the systems display 160 in a conventional manner.

The preferred embodiment illustrated herein was developed using Macromedia Director, version 5.0, available from Macromedia, Inc. of San Francisco, Calif., including the Lingo™ scripting language provided therein. The implementation of the methods and systems of the present invention using Macromedia Director, or comparable tools, will be apparent to those of ordinary skill in the art when combined with the foregoing description and additional content which follows. For example, various methods and techniques for defining and displaying windows with associated task bars and border regions are well known in the art, as are methods and techniques for displaying bitmaps in the client area of such windows. As such, the present invention can be implemented with success with any of various off-the-shelf multimedia or other design tools.

In implementing the preferred embodiment described herein, the original text bitmap 88 of the Codex Leicester manuscript was converted to a bitmap, sized 1,115 pixels tall by 845 pixels wide. A corresponding English translation bitmap 90 and an Italian transcription bitmap (not shown) of the same size were also created. The selection of the English words to correspond to the original text was done in the manner of a conventional translation. The text of the English translation was spatially aligned with respect to the original text and illustrations, such that the English language word corresponding to the original text was positioned at the same location within the translation bitmap 90 as the original text was in the original text bitmap 88, to the extent possible. It will be appreciated that translations do not always result in word for word correspondence, or words of equal length. Therefore, the positioning of the English language text with respect to the words of the handwritten manuscript necessarily involves certain artistic and design choices. The manuscript illustrations were copied exactly from the original text bitmap 88 into the English translation bitmap 90. A dim image of the original handwritten text was also reproduced in the English translation and Italian transcription to provide an enhanced user experience.

In the preferred embodiment illustrated herein, each pixel of the bitmaps is comprised of 4 bits. This pixel size was selected in lieu of a conventional 8 bit pixel to enhance performance of the system. Although this arrangement does not permit access to the spectrum of colors as might otherwise be available in a display, the relatively monochromatic nature of manuscripts and textual material makes such a selection suitable for many applications.

In the preferred embodiment, the Codex Leicester is modeled as an object made up of thirty-six unique sheets. Each sheet is modeled as an object made up of two unique pages, such as page 30, for example. Each page is modeled as an object made up of one or more unique page parts. Each page part is modeled as an object and corresponds to one of six unique subjects on the subject list 24. Finally, each subject is modeled as an object. This design yields (i) a hierarchy of objects representing the structure of the Codex (i.e., entire Codex-sheet-page-page part) and (ii) a map of the information distribution in the Codex (page part-topic).

The relationships between the various objects (e.g., which page belongs to which sheet, which page parts correspond to which subject, etc.) is static, i.e., they do not change as the user browses and navigates around the Overview screen 20, for example. What is dynamic, however, is what the user is doing, specifically where the mouse is located and whether it is clicked. This is where the ability of objects to communicate with other objects comes in. Some examples: (i) In the overview screen 20, when the user rolls the mouse over a given subject's word, the subject object interprets this as a user request to see all pages dealing with this topic. The topic object highlights its word and sends a message to these particular page objects, which in turn highlight their icons. (ii) In a sheet view screen (not shown), when the user rolls the mouse over a particular sheet's cell in the map, the sheet object interprets this as a user request to see all subjects covered on this sheet. The sheet object highlights its cell, and sends a message to these particular topic objects, which in turn highlight their words. If the user clicks on the cell, the sheet object displays its sheet image. (iii) In the page view screen 40, if the user rolls the mouse over a particular part of the page image, the page part object interprets this as a user request to see which topic is discussed in this part of the page. The page part object highlights its portion of the page image, and sends a message to the topic object, which in turn highlights its word. If the user clicks on the image, the page object passes control to the Codescope, which in turn displays the page image.

Thus, the browsing and navigation functionality of the preferred embodiment described herein is implemented as a static structure of objects, paralleling the structure of the Codex Leicester, and serving as a communications network for the objects. Each dynamic user event (mouse roll over, mouse click) is communicated as a message to all objects involved, which in turn display graphic highlights, thus presenting information to the user corresponding to the event.

Figure 17:
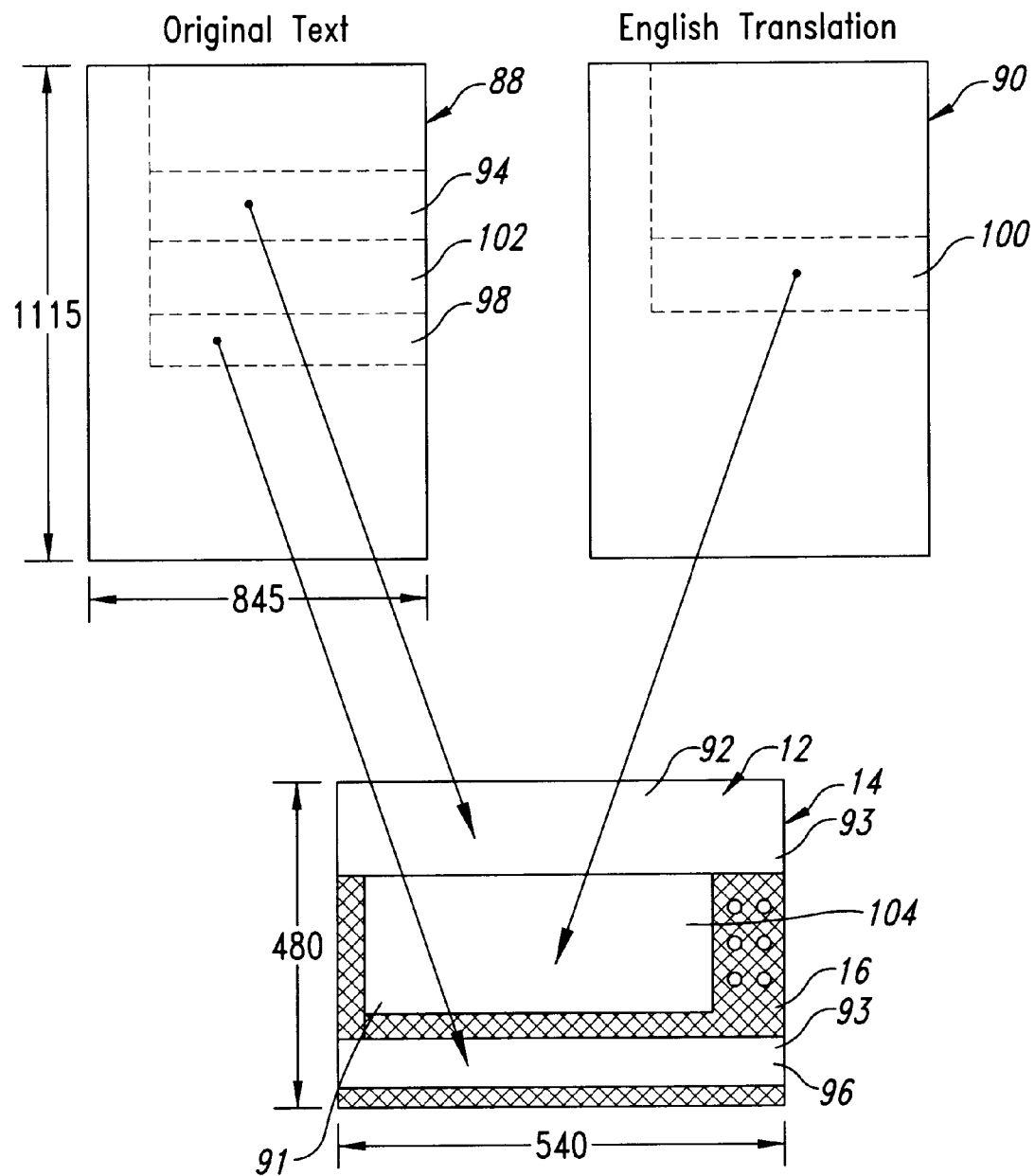
FIG. 17 is a schematic illustration of a bitmap image of the original text and the English translation for a single page in the preferred embodiment, showing how portions are mapped to the computer screen display.

FIG. 17 illustrates schematically the contents of the original text bitmap 88 and the English language translation bitmap 90 and their projection onto the computer screen 14. When the translation window 16 is being displayed, the upper portion 92 of the client portion 93 (i.e., the portion of the window not used to display window elements such as the task bar, side bars and borders, and therefore available for data display by "client" applications) of the main display 12 displays a first portion 94 of the original text bitmap 88, while the lower portion 96 of the main display displays a second portion 98 of the original text bitmap 88. A portion 100 of the English translation bitmap 90 corresponding to the obscured portion 102 of the original text bitmap 88 is displayed in the client portion 91 of the translation window 16.

It will be appreciated that, while the illustration of FIG. 17 shows the original text bitmap 88 mapping to the client portion 93 of the main display 12, and the English language translation bitmap 90 mapping to the client portion of the translation window 16, other arrangements are possible. As discussed above, the user may select either the original text, the English translation or the Italian transcription for display in the main display 12 and/or the translation window 16. Further, it will be appreciated that when the translation window is closed, the upper portion 92, lower portion 98 and obscured portion 102 of the original text bitmap 88 (or an alternative bitmap selected by the user) will be displayed in the main display 12.

Figure 18:
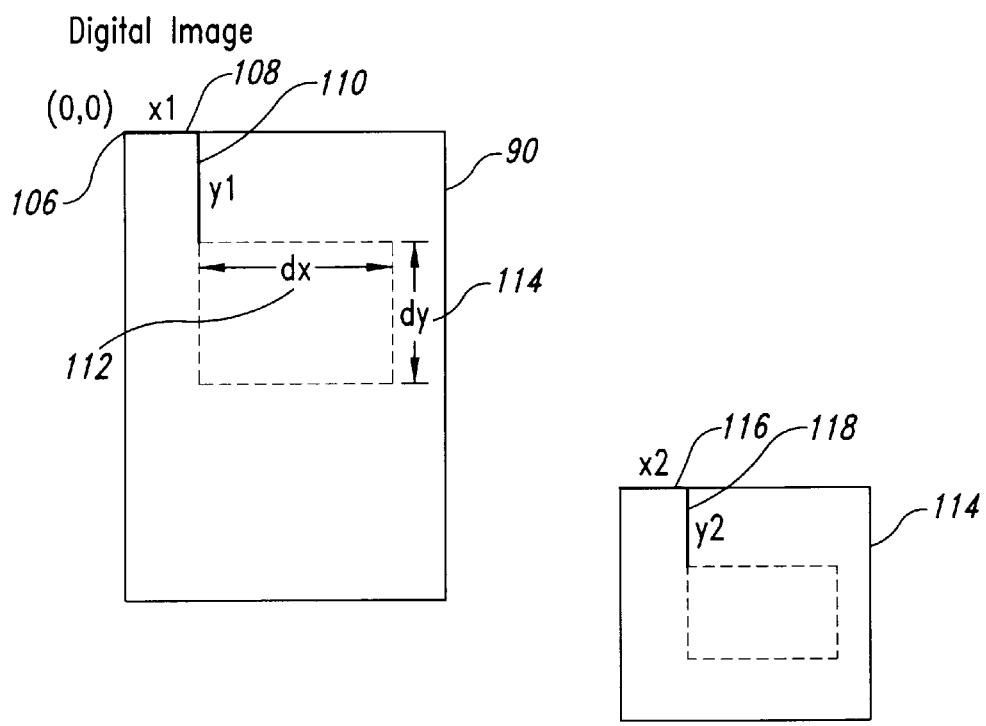
FIG. 18 is an illustration of the offsets used to calculate the displays in accordance with a preferred embodiment of the present invention.

While the display of these regions can all be accomplished using Macromedia Director, Version 5.0, or comparable tools in a conventional manner, performance considerations may dictate the creation of special display routines to improve the speed with which the appropriate contents are displayed. For example, in the preferred embodiment described herein, it was found desirable to define offsets from an origin 106 at the upper left-hand corner of the original text bitmap 88 and English translation bitmap 90. A special routine titled "Show" was developed to accept the offsets x1 108 and y1 110 representing the location (in number of pixels from the origin 106) of the upper right-hand corner of the image to be displayed. Parameters dx 112 and dy 114 define the size of the image. Parameters x2 116 and y2 118 represent the offset of the image on the computer's display screen 114, when the image to be displayed is within the display window (see FIG. 18).

Figure 19:
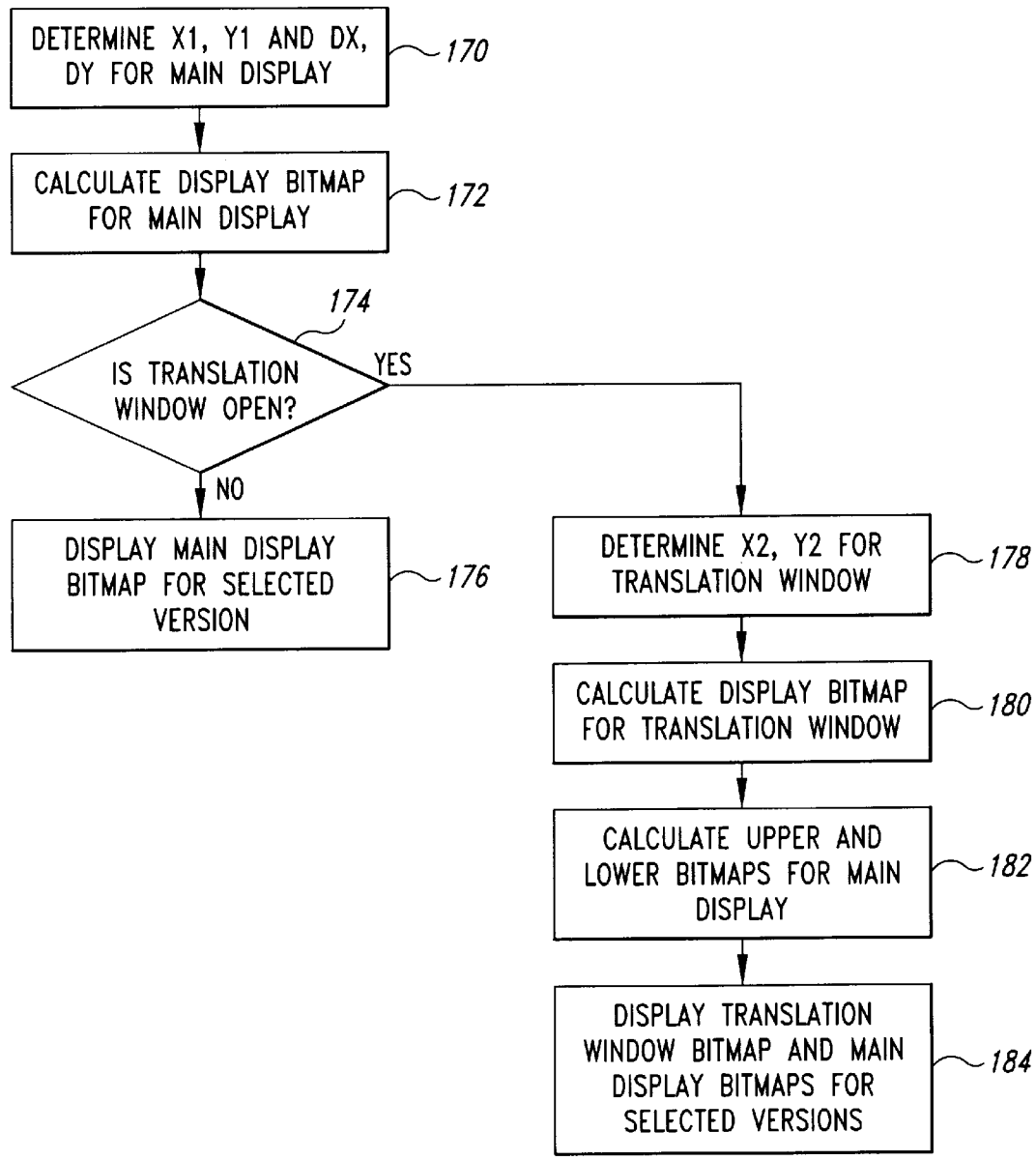
FIG. 19 is a flow diagram illustrating a method for calculating and displaying original text and translation bitmaps in the main display and translation window.

FIG. 19 illustrates a method for displaying the main display 12 and translation window 16 images. At step 170, the x1, y1 and dx, dy values for the main display are determined. The x1, y1 information defines the location on the image bitmap to be displayed at upper left hand corner of the main display's client area. The dx, dy information determines the size of the bitmap regions (e.g., 94, 98 in FIG. 17) to be displayed, which will be a function of screen size and the size of the window border elements selected. With this information, the bitmap size and location can be calculated at step 172.

If the translation window is closed, step 174, then the bitmap can be displayed, step 176. If the translation window is open, the x2, y2 values are determined, step 178, based on the location of the translation window 16 within the main display 12. With the information, and the size of the translation window (which is fixed in the preferred embodiment, illustrated herein), the display bitmap for the translation window can be calculated, step 180 as well as the bitmaps for the upper bitmap 94 and lower bitmap 98 (see FIG. 17) for display in the main display, step 182. These bitmaps are loaded into the display device driver in a conventional manner to cause the desired displays to occur, step 184.

The conventional Macromedia Director routines were also supplemented with a special "Flip" routine which allows mirror images of the bitmaps to be displayed. Alternately, where storage space is not an issue, separate bitmaps representing an original image and a mirror image can be maintained.

The mirror function or flip routine of the preferred embodiment reverses the horizontal orientation of the displayed image, so that any text that is displayed may either be read in normal fashion, left to right, or right to left, as Leonardo da Vinci originally wrote it. This function is implemented as an additional step in the display operation. When the user selects the mirror function, the system performs an iterative swapping of pixels across the memory locations where the image data are stored in such a manner that the graphic image is reversed left for right. Then the display software updates the screen from these memory locations using the techniques already described. The system uses a similar, but separate, low level algorithm for swapping the pixels of a graphic image made up of 8-bit pixels versus one made up of 4-bit pixels.

When the original document and its translation are visible on the screen at the same time, or two separate translations are visible on the screen at the same time (i.e., when the translation window is open), the system preferably performs the iterative swapping of pixels for each image, and then updates the screen using the techniques already described; in this fashion a translation is always seen to flip simultaneously with its mated document, and is thus always at the same horizontal orientation.

Although the present invention has been described with respect to the preferred embodiment illustrated herein, it is understood that the invention is not limited by this embodiment, but rather is defined by the claims which follows. Variations and alternate implementations of the present invention will be apparent to those of skill in the art.

We claim:

1. A method of displaying an original document having text and possibly non-text images therein, and a translation of the original document, comprising the steps of:

creating a bitmap image of the original document;

creating a translation bitmap of the same size as the original document bitmap, the translation bitmap including reproductions of any non-text images in the original document and translations of the text of the original document, the translated text and any non-text images in the translation bitmap being spatially aligned with respect to the original document bitmap such that any non-text images appear at the same location in the original document bitmap and the translation bitmap, and the translated text appears at a location in the translation bitmap proximate to the location of the corresponding text in the original document bitmap;

storing the bitmaps for use in a computer system having a display;

displaying at least a portion of the original document bitmap in a main display area on the computer system display; and displaying a translation window over the main display area, with the translation window displaying the portion of the translation bitmap that corresponds to the portion of the original document bitmap covered by the translation window.

2. The method of claim 1, further including the step of creating a second translation bitmap, the second translation bitmap including reproductions of any non-text images in the original document and translations of the text of the original document to a language or form different than the first translation bitmap, the translated text and any non-text images of the second translation bitmap being spatially aligned with respect to the original document bitmap such that any non-text images appear at the same location in the original document bitmap and the second translation bitmap, and the translated text appears at a location in the second translation bitmap proximate to the location of the corresponding text in the original document bitmap; and selectively displaying in the translation window the portion of the second translation bitmap that corresponds to the portion of the original document bitmap covered by the translation window.

3. The method of claim 1, further including the step of changing the main display area to display the portion of the translation bitmap corresponding to the portion of the original document bitmap previously displayed in the main display.

4. The method of claim 1, further including the step of changing the content of the translation window to display the portion of the original document bitmap corresponding to the portion of the translation bitmap formerly displayed in the translation window.

5. The method of claim 1 for use in conjunction with a multi-page original document, wherein an original document bitmap and translation bitmap is created for each page of the original document, the method further comprises the step of providing an overview screen showing reduced size images of the various original document bitmaps.

6. The method of claim 5 further comprising the step of providing a plurality of subject matter categories displayed in a subject matter list on the overview page, and logically linking the contents of the various pages to the subject list.

7. The method of claim 6, further comprising the step of highlighting the linked portions of the various pages when an entry on the subject list is selected by a user.

8. The method of claim 6, further comprising the step of highlighting the linked entries on the subject matter list when a page is selected by a user.

9. The method of claim 1 wherein the size of the original document bitmap is larger than the main display, further comprising the step of scrolling the image displayed in the main display, and in response to scrolling of the main display, scrolling the translation windows contents such that the contents of the translation window continue to correspond to the portion of the original document bitmap which is covered by the translation window during the scrolling.

10. The method of claim 1, further including the step of transforming the original document bitmap prior to display, to display a mirror image of the original document.

11. The method of claim 1, further including the step of transforming the translation bitmap prior to display, to display a mirror image of the translated document.

* * * * *